(12) United States Patent
Hawkins et al.

(10) Patent No.: US 8,418,125 B2
(45) Date of Patent: Apr. 9, 2013

(54) INCREMENTAL MODEL REFINEMENT AND TRANSFORMATION IN GENERATING COMMERCE APPLICATIONS USING A MODEL DRIVEN ARCHITECTURE

(75) Inventors: Jennifer L. Hawkins, Toronto (CA); Igor Ivkovic, Kitchener (CA); Konstantinos Kontogiannis, Toronto (CA); Ross McKegney, Toronto (CA); Walfrey Ng, Markham (CA); Tack Tong, Scarborough (CA)

(73) Assignee: International Business Machines Corporation, Armonk, OR (US)

( * ) Notice: Subject to any disclaimer, the term of this patent is extended or adjusted under 35 U.S.C. 154(b) by 1741 days.

(21) Appl. No.: 11/743,958

(22) Filed: May 3, 2007

(65) Prior Publication Data

US 2008/0276229 A1    Nov. 6, 2008

(51) Int. Cl.
*G06F 9/44* (2006.01)
*G06F 9/45* (2006.01)

(52) U.S. Cl.
USPC .......................... 717/104; 717/106; 717/136

(58) Field of Classification Search ................ None
See application file for complete search history.

(56) References Cited

U.S. PATENT DOCUMENTS

| | | | | |
|---|---|---|---|---|
| 6,502,112 | B1* | 12/2002 | Baisley | 715/210 |
| 2006/0064667 | A1* | 3/2006 | Freitas | 717/104 |
| 2007/0180424 | A1* | 8/2007 | Kazakov et al. | 717/104 |
| 2008/0082959 | A1* | 4/2008 | Fowler | 717/104 |

FOREIGN PATENT DOCUMENTS

WO    2006043012 A1    4/2006

OTHER PUBLICATIONS

Kurtev et al., "UML to XML-Schema Transformation: a Case Study in Managing Alternative Model Transformations in MDA," 2003.*
Emerson et al, "A MOF-Based Metamodeling Environment," Journal of Universal Computer Science, vol. 10, No. 10 (2004), 1357-1382.*
Karsai et al., "Model-Integrated Development of Embedded Software," Proceedings of the IEEE, vol. 91, No. 1, Jan. 2003.*
Lu, Shourong, et al; A Component-based UML Profile to Model Embedded Real-Time Systems Designed by the MDA Approach; IEEE; RTCSA 2005.
Lengyel, Laszlo, et al; Constraint Validation Support in Visual Model Transformation Systems; Acta Cybernetica 17 (2005) 339-357.
Lujan-Mora, Sergio, et al; A UML Profile for Multidimensional Modeling in Data Warehouses; ScienceDirect, 2005.
Schippers,Hans, et al; Leveraging UML Profiles to Generate Plugins from Visual Model Transformations; Elsevier Science B.V., 2004.
Guttman, Michael; "Real MDA" Stands Up; Software Mag. May 2006.
Min, Hyun, et al; A UML Profile for Specifying Component Design as MDA/PIM; British Library 2004.

* cited by examiner

*Primary Examiner* — Insun Kang
(74) *Attorney, Agent, or Firm* — Steven M. Greenberg, Esq.; Carey, Rodriguez, Greenberg & O'Keefe

(57) ABSTRACT

In one embodiment of the invention, a method for profile mapped model transformation for model driven architecture (MDA) development of service provisioning applications can be provided. The method can include mapping elements of a platform independent domain specific model to a platform specific domain specific model for a target platform with stereotypes in a uniform modeling language (UML) profile defined for the target platform. The method further can include transforming a platform independent domain specific model into a platform specific domain specific model for a target platform by applying the stereotypes of the UML profile defined for the target platform. Finally, the method can include generating shell source code for the transformed platform specific domain specific model.

16 Claims, 2 Drawing Sheets

INCREMENTAL MODEL REFINEMENT AND TRANSFORMATION IN GENERATING COMMERCE APPLICATIONS USING A MODEL DRIVEN ARCHITECTURE

BACKGROUND OF THE INVENTION

1. Field of the Invention

The present invention relates to the field of software application development and more particularly to the application of a model driven architecture (MDA) in the design and implementation of service provisioning applications.

2. Description of the Related Art

As businesses and consumers become further interconnected through computer communications networks such as the global Internet and local intranets, commerce and other service provisioning sites along with companion computing applications which integrate interactions between businesses and consumers alike, can become ever more complex. Addressing the explosion of business to business and business to consumer interactions on-line, information technologists increasingly focus on architecting and implementing complete software application solutions to reflect the entire life cycle of a business in lieu of integrating multiple, disparate applications which when combined reflect the business life cycle. Consequently, as modern software application and service provisioning sites can be both large and distributed, service provisioning systems have been configured to deploy complete services in as seamless a fashion as possible.

It is now a common trend that traditional, stand-alone, service provisioning oriented applications are produced from one or more components which can be individually re-used to create business processes for different solutions. Each of these components can expose itself as a set of services comporting with computing standards for deploying enterprise level logic that facilitate an open service provisioning architecture. A service provisioning architecture such as Service Oriented Architecture (SOA), essentially can be defined as a collection of services. These services communicate with each other. This communication can involve either simple data passing between two or more services, or activity coordinating between two or more services.

The Model Driven Architecture (MDA) approach has been proposed and promoted over the past few years as a methodology for streamlining the design and implementation of enterprise systems. Generally, in MDA each design artifact of the enterprise system can be represented as a Platform Independent Model (PIM) that is generated by or is compliant with a Computation Independent Model. This PIM is able to be transformed to a corresponding Platform Specific Models (PSM) and ultimately to source code that complies with specific programmatic paradigms and patterns. In this context, a PIM represents the elements and components of a software system in a way that is not bound or dependent to a specific implementation technology. By comparison, a PSM represents the elements and components of a software system in a way that directly relates to the implementation technology that will be used for implementing such a system.

Even though MDA frameworks have caught the attention of the software engineering community as a way to increase programmer productivity and overall system robustness through the disciplined manipulation and transformation of models and ultimately code generation, MDA as a methodology has remained so far only as a "guideline" or "standard practice" that is left to be implemented by the individual organizations and software vendors. In this respect, important questions regarding which types of models are to pertain to PIMs and PSMs, how transformations are to be encoded and enacted, how constraints are to be denoted and validated, and how source code is to be generated, remains left to software vendors, software architects and software developers to further design and implement.

Currently, there are a number of tools that support MDA compliant or semi-compliant software development. More specifically, existing MDA tools can be classified in two main categories namely, "full-MDA-capability" tools that incorporate modeling, transformation, and code generation infrastructure, and "limited-MDA-capability" tools that incorporate only code generation infrastructure using specific, typically unified model language (UML), models as input. In fact, in current approaches UML profiles and included stereotypes have been used to provide means for semantically annotating (tagging) collections of PIM or PSM, Meta-Object Facility (MOF) compliant models, for standardizing elements of specific platforms, or for denoting the operation names of transformations.

BRIEF SUMMARY OF THE INVENTION

Embodiments of the present invention address deficiencies of the art in respect to the design and implementation of an MDA compliant process for service provisioning applications and provide a novel and non-obvious method, system and computer program product for incrementally refining and transforming a model in generating a commerce application using MDA. In this regard, the present invention contributes towards the development of a generalized MDA compliant framework that can be used for the design and implementation of large service provisioning software applications. In particular, the invention addresses the drawbacks of existing tools and techniques through an incremental transformation framework.

In the framework PIM and PSM structural and programmatic elements of workflow-based commerce applications can be modeled in an open and extensible way as MOF compliant models. In the framework, Platform Independent Models and Platform Specific Models that are considered in the context of a specific application domain are referred as Platform Independent Domain Specific Models and Platform Specific Domain Specific Models, respectively. These models are separated into two parts—namely a core set of model entities, and process specific model entities. Thereafter, PIM associations can be encoded to PSM associations using UML profiles and stereotypes. Once the associations have been encoded, source code can be generated for commerce software applications for multiple platforms and languages through the use of fully customized code templates. Hence, by modeling each PIM and PSM in an open way as MOF models that can be extended incrementally through inheritance, associations and aggregation to denote specific applications in a given domain, the core PIM or PSM model can be decoupled from any model extensions that pertain to specific properties of the process or application being specified.

Consequently, greater flexibility can be provided in generating richer PSMs and the generation of code and systems to several target platforms can be facilitated. Furthermore, by encoding PIMs and PSMs using UML profiles and stereotypes, a simple, yet expressive way of modeling PIM and PSM model associations can be provided at a higher level than a conventional query/view/transformation (QVT) model transformation formalism or any other rule-based model transformation formalism. This approach also allows for the transformation rules themselves to be modeled in a MOF compliant way, and therefore the automatic generation of QVT or any other formalism for model transformation rules is possible.

In one embodiment of the invention, a method for profile mapped model transformation for MDA development of commerce applications can be provided. The method can include mapping elements of a platform independent domain specific model to a platform specific domain specific model for a target platform with stereotypes in a UML profile defined for the target platform. The method further can include transforming a platform independent domain specific model into a platform specific domain specific model for a target platform by applying the stereotypes of the UML profile defined for the target platform. Finally, the method can include generating shell source code for the transformed platform specific domain specific model.

In one aspect of the embodiment, the method further can include transforming a high level artifact model into the platform independent domain specific model through an extension of classes of a platform independent meta-model. In another aspect of the embodiment, the method additionally can include annotating the high level artifact model to provide for extension points to the high level artifact model. In yet another aspect of the embodiment, the method even yet further can include representing the high level artifact model as Meta-Object Facility (MOF) compliant elements, arranging the MOF compliant elements as class diagrams, and mapping the MOF compliant elements in the class diagrams through an extensible markup language (XML) meta-data interchange (XMI) into an XML form.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for profile mapped model transformation for MDA development of commerce applications. In accordance with an embodiment of the present invention, a profile of multiple different stereotypes can be established by mapping classes in a PIM meta model to classes in a PSM meta model for a specific target platform. In particular, MOF classes in the PIM can be used within different profiles for different target platforms to stereotype elements in different PSM meta model for the different specific target platforms. Thereafter, a profile for a desired target platform can be applied to the PIM meta model to transform the PIM meta model to a PSM for the desired target platform. Finally, a source code shell can be generated from the PSM.

Figure 1:
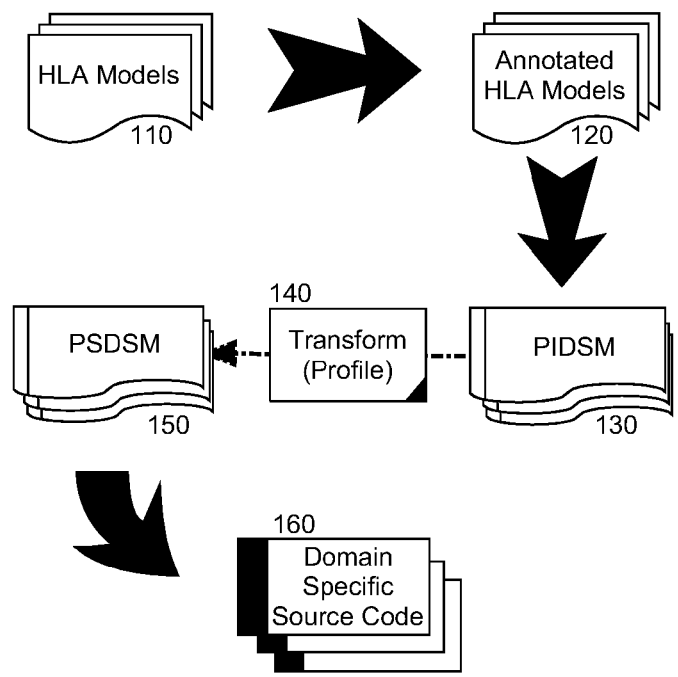
FIG. 1 is a block diagram illustrating a process for profile mapped model transformation for MDA development of commerce applications.

In illustration, FIG. 1 is a block diagram illustrating a process for profile mapped model transformation for MDA development of commerce applications. Initially, a set of high-level artifact models 110 can be annotated with information on roles, deployment, incoming and outgoing data flows types, ontology annotations for the workflow tasks, and general descriptions on the flow functionality and purpose in order to produce a set of annotated high-level artifact models 120. The annotated set of high-level artifact models 120 can be leveraged to provide extension points for enhancements to the set of high-level artifact models 110 that can be used for increasing the accuracy of code generated for the set of high-level artifact models 110.

The annotated set of high-level artifact models 120 can be transformed into a set of platform independent domain specific models 130 that conform to corresponding PIM metamodels. The PIM meta-models can contain entities such as Process, Task, Service, Registry and Protocol, by way of example. In this regard, the PIM meta-models can serve as a shell architecture for defining service provisioning applications irrespective of the application domain. The PIM meta-models can be populated with domain specific extensions to produce the platform independent domain specific models 130 for a given application.

A transformation profile 140 can be applied to the platform independent domain specific models 130 to transform the platform independent domain specific models 130 into platform specific domain specific models 150. Specifically, stereotypes within the transformation profile 140 can map extensions to the elements of the platform independent domain specific models 130 to respective elements or patterns of elements in the platform specific domain specific models 150. Finally, domain specific source code transformation templates can be used to generate domain specific shell source code 160 for the elements of the platform specific domain specific models 150.

Figure 2:
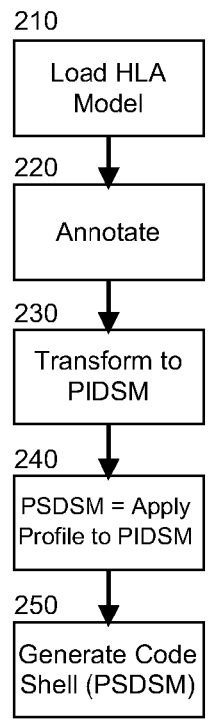
FIG. 2 is a flow chart illustrating a process for profile mapped model transformation for MDA development of commerce applications; and, FIG. 3 is a schematic illustration of a profile mapped transformation of a platform-independent domain specific model into different platform-specific domain specific models via profile mapping.

In further illustration, FIG. 2 is a flow chart illustrating a process for profile mapped model transformation for MDA development of commerce applications. The process can begin in block 210 with the loading of a high-level artifact model and the process can continue in block 220 with the annotation of the high-level artifact model. In block 230, the annotated high-level artifact model can be transformed into a platform independent domain specific model. Notably, in the MDA framework of the present invention, each PIM and PSM can be represented as MOF compliant elements—namely class diagrams—that can be mapped through XMI to an XML form readable and interchangeable with off the shelf acceptable computer aided software engineering tools. The classes of each PIM can be extended into a platform independent domain specific model for a specific commerce application through specializations, aggregations and associations.

In block 240, the platform independent domain specific model can be transformed into a platform dependent domain specific model through the application of a UML profile and the stereotypes contained therein. Specifically, associations can be enacted between elements in the platform independent domain specific model and elements in the platform dependent domain specific model through stereotypes and constraints in a UML profile. For example, UML 2.0 profiles and stereotypes can be used as a means to associate PIM and PSM elements in that MOF classes in the PIM meta model can be used as UML profiles of PSM elements. In its simplest form this technique can be used to associate one PIM meta model element such as a class with one PSM meta model element such as another class. The association can be enacted through profiling the PSM class with one corresponding PIM class. Notably, in a more elaborate form, a class element in the PIM meta model, can profile an entire pattern of PSM elements.

The method of associating PIM and PSM meta model elements enjoys the advantage of not depending on a specific association rule language such as QVT, the Atlas transformation language (ATL) or the model transformation language (MTL). Rather, the PIM/PSM profile-based association model of the present invention can be used to automatically generate QVT, ATL, MTL or any other association type rules. Also, the association model of the present invention can be based upon MOF elements and can be used by any tool that imports XMI models, and therefore the associations can be easily ported to any MOF compliant tool.

Additionally, one can generate profile-based associations merely by creating a UML model using any UML editing tool. In this respect there is no need for specialized editors for association rules. Finally, since UML 2.0 allows for profiles to be associated with constraints and stereotypes, the technique described herein supports the use of stereotypes to denote in detail the semantics of the PSM meta model elements as well as the use of constraints represented in object constraint language (OCL). The constraints can denote both pre and also post conditions for the modeling of operations that can be associated with PSM patterns such as the template to be used for code generation.

Finally, in block 250, shell code can be generated for the platform specific domain specific models. In this regard, statically defined templates can be associated with PSM meta model element classes. Once PSM meta models have been instantiated as PSM models for a given instance of a domain specific process then the templates will relate to specific template attributes for the statically defined templates. Subsequently, extensible style sheet transformations (XSLT) can transform the XMI representation of the template and the PSM model to source text, though other transformers can be incorporated including custom transformers written in JAVA programming language and integrated in the ECLIPSE modeling framework (EMF).

Figure 3:
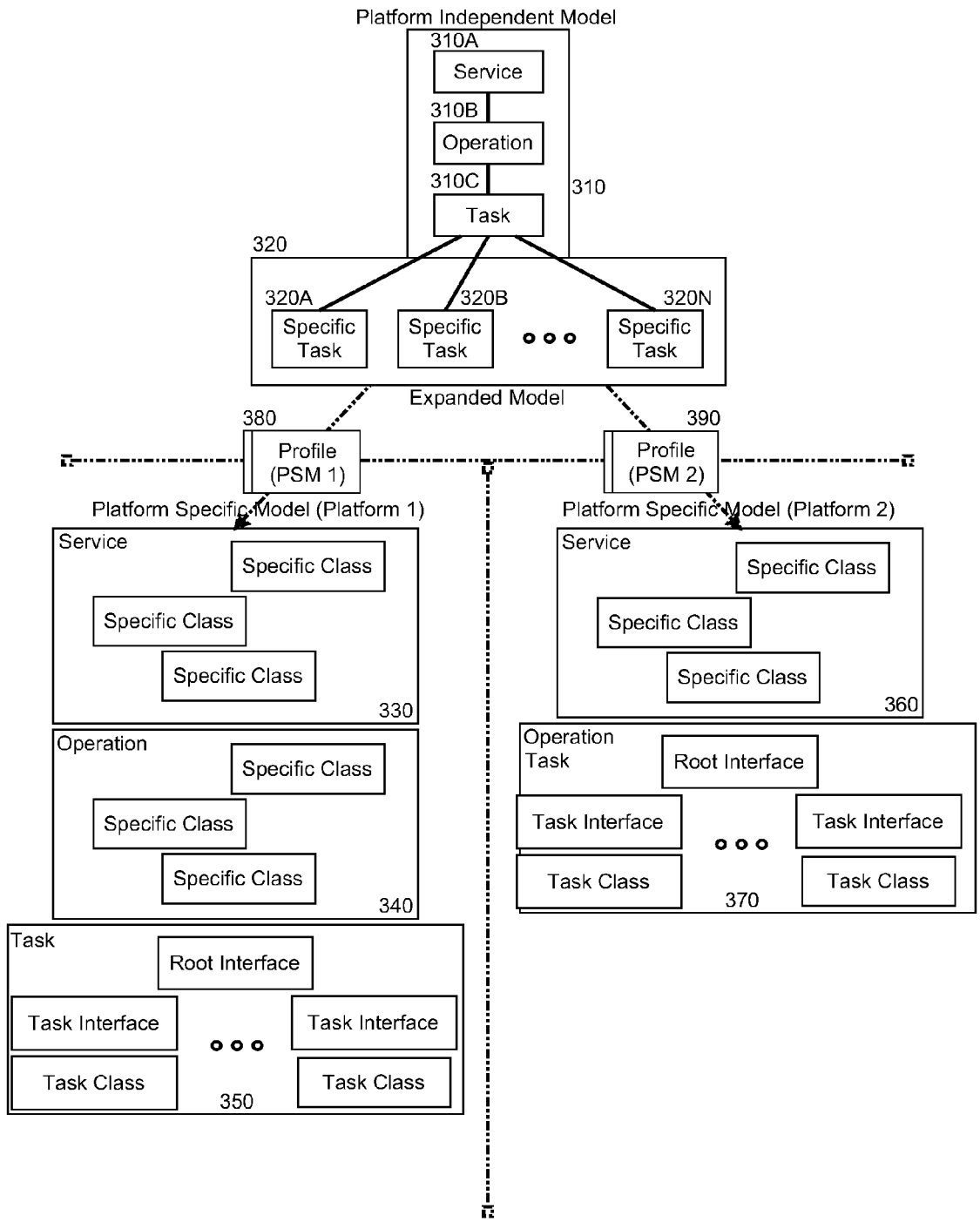

In yet further illustration, FIG. 3 is a schematic illustration of a profile mapped transformation of a platform-independent domain specific model into different platform-specific domain specific models via profile mapping. As shown in FIG. 3, a PIM 310 can be extended into an expanded model for a specific application domain, the extension referred to herein as a platform independent domain specific model 320. The expanded model can be produced through the extension of the base classes 310A, 310B, 310C of the PIM 310 into specific classes 320A, 320B, 320N of the platform independent domain specific model 320. The extension of the PIM 310 into the platform independent domain specific model 320 can be performed through specialization, aggregation and association as it will be recognized by the skilled artisan.

Profiles 380, 390 can be defined with suitable stereotypes and constraints mapping the classes of the platform independent domain specific model 320 into different classes 330, 340, 350, 360, 370 of different platform specific models. In this regard, the profile 380 for one specific platform such as an SOA platform can map the classes of the platform independent domain specific model 320 into a separate class or pattern of classes 330, 340, 350 for a corresponding platform specific model. Likewise, the profile 390 for another specific platform such as a legacy proprietary platform can map the classes of the platform independent domain specific model 320 into a separate class or pattern of classes 360, 370 for a corresponding platform specific model.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-usable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method for profile mapped model transformation for model driven architecture (MDA) development of service provisioning applications, the method comprising:

mapping elements of a platform independent domain specific model to a platform specific domain specific model for a target platform with stereotypes in a unified modeling language (UML) profile defined for the target platform;

transforming a platform independent domain specific model into a platform specific domain specific model for a target platform by applying the stereotypes of the UML profile defined for the target platform; and, generating shell source code for the transformed platform specific domain specific model.

2. The method of claim 1, further comprising transforming a high level artifact model into the platform independent domain specific model through an extension of classes of a platform independent meta-model.

3. The method of claim 2, further comprising annotating the high level artifact model to provide for extension points to the high level artifact model.

4. The method of claim 2, further comprising:
representing the high level artifact model as Meta-Object Facility (MOF) compliant elements;
arranging the MOF compliant elements as class diagrams; and,
mapping the MOF compliant elements in the class diagrams through an extensible markup language (XML) meta-data interchange (XMI) into an XML form.

5. The method of claim 1, wherein mapping elements of a platform independent domain specific model to a platform specific domain specific model for a target platform with stereotypes in a UML profile defined for the target platform, comprises mapping elements of a platform independent domain specific model to a pattern of elements in a platform specific domain specific model for a target platform with stereotypes in a UML profile defined for the target platform.

6. The method of claim 1, wherein generating shell source code for the transformed platform specific domain specific model, comprises:
associating statically defined templates with platform specific meta model element classes;
instantiating a platform specific meta model for a given instance of a domain specific process; and,
transforming an extensible markup language (XML) meta-data interchange (XMI) representation of the statically defined template and the platform specific meta model to source code.

7. The method of claim 6, wherein transforming an XMI representation of the statically defined template and the platform specific meta model to source code, comprises transforming an XMI representation of the statically defined template and the platform specific meta model through extensible style sheet transformations (XSLT) to source text.

8. The method of claim 6, wherein transforming an XMI representation of the statically defined template and the platform specific meta model to source code comprises transforming an XMI representation of the statically defined template and the platform specific meta model through a custom Java transformer integrated in an Eclipse modeling framework (EMF).

9. A computer program product comprising a computer usable storage medium embodying computer usable program code for profile mapped model transformation for model driven architecture (MDA) development of service provisioning applications, the computer program product comprising:
computer usable program code for mapping elements of a platform independent domain specific model to a platform specific domain specific model for a target platform with stereotypes in a unified modeling language (UML) profile defined for the target platform;
computer usable program code for transforming a platform independent domain specific model into a platform specific domain specific model for a target platform by applying the stereotypes of the UML profile defined for the target platform; and,
computer usable program code for generating shell source code for the transformed platform specific domain specific model.

10. The computer program product of claim 9, further comprising computer usable program code for transforming a high level artifact model into the platform independent domain specific model through an extension of classes of a platform independent meta-model.

11. The computer program product of claim 10, further comprising computer usable program code for annotating the high level artifact model to provide for extension points to the high level artifact model.

12. The computer program product of claim 10, further comprising:
computer usable program code for representing the high level artifact model as Meta-Object Facility (MOF) compliant elements;
computer usable program code for arranging the MOF compliant elements as class diagrams; and,
computer usable program code for mapping the MOF compliant elements in the class diagrams through an extensible markup language (XML) meta-data interchange (XMI) into an XML form.

13. The computer program product of claim 9, wherein the computer usable program code for mapping elements of a platform independent domain specific model to a platform specific domain specific model for a target platform with stereotypes in a UML profile defined for the target platform, comprises computer usable program code for mapping elements of a platform independent domain specific model to a pattern of elements in a platform specific domain specific model for a target platform with stereotypes in a UML profile defined for the target platform.

14. The computer program product of claim 9, wherein the computer usable program code for generating shell source code for the transformed platform specific domain specific model, comprises:
computer usable program code for associating statically defined templates with platform specific meta model element classes;
computer usable program code for instantiating a platform specific meta model for a given instance of a domain specific process; and,
computer usable program code for transforming an extensible markup language (XML) meta-data interchange (XMI) representation of the statically defined template and the platform specific meta model to source code.

15. The computer program product of claim 14, wherein the computer usable program code for transforming an XMI representation of the statically defined template and the platform specific meta model to source text, comprises computer usable program code for transforming an XMI representation of the statically defined template and the platform specific meta model through extensible style sheet transformations (XSLT) to source code.

16. The computer program product of claim 14, wherein the computer usable program code for transforming an XMI representation of the statically defined template and the platform specific meta model to source text, comprises computer usable program code for transforming an XMI representation of the statically defined template and the platform specific meta model through a custom Java transformer integrated in an Eclipse modeling framework (EMF).

* * * * *